(12) United States Patent  (10) Patent No.: US 9,313,210 B2
Coletrane et al.  (45) Date of Patent: Apr. 12, 2016

(54) AUTOMATED PRIVACY LEVEL SUGGESTIONS FOR SOCIAL NETWORKING

(75) Inventors: Candice L. Coletrane, Durham, NC (US); William G. Pagan, Durham, NC (US); Adam J. Parker, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 13/170,049

(22) Filed: Jun. 27, 2011

(65) Prior Publication Data

US 2012/0331396 A1    Dec. 27, 2012

(51) Int. Cl.
  *G06Q 50/00*  (2012.01)
  *H04L 29/06*  (2006.01)

(52) U.S. Cl.
  CPC .............. *H04L 63/105* (2013.01); *G06Q 50/01* (2013.01)

(58) Field of Classification Search
  CPC .. G06F 21/604; G06Q 50/01; H04N 21/4532; H04L 63/102; H04L 63/104; H04L 63/205
  USPC ........................................................ 715/751
  See application file for complete search history.

(56) References Cited

U.S. PATENT DOCUMENTS

| | | | |
|---|---|---|---|
| 7,340,438 B2 | 3/2008 | Nordman et al. | |
| 7,832,003 B2 | 11/2010 | Kelly et al. | |
| 8,234,688 B2 * | 7/2012 | Grandison et al. | 726/1 |
| 2008/0127298 A1 | 5/2008 | Reeves et al. | |
| 2008/0134292 A1 * | 6/2008 | Ariel et al. | 726/3 |
| 2009/0070334 A1 * | 3/2009 | Callahan et al. | 707/9 |
| 2009/0259519 A1 | 10/2009 | Cronin et al. | |
| 2009/0265326 A1 | 10/2009 | Lehrman et al. | |
| 2009/0271370 A1 | 10/2009 | Jagadish et al. | |
| 2009/0300351 A1 | 12/2009 | Lei et al. | |
| 2010/0024042 A1 * | 1/2010 | Motahari et al. | 726/26 |
| 2010/0077484 A1 | 3/2010 | Paretti et al. | |
| 2011/0004922 A1 | 1/2011 | Bono et al. | |
| 2011/0029566 A1 * | 2/2011 | Grandison et al. | 707/783 |
| 2011/0209192 A1 * | 8/2011 | LeClerc Greer et al. | 726/1 |
| 2011/0246574 A1 * | 10/2011 | Lento et al. | 709/204 |
| 2011/0283336 A1 * | 11/2011 | Lange et al. | 726/1 |
| 2013/0198811 A1 * | 8/2013 | Yu et al. | 726/4 |
| 2014/0058965 A1 * | 2/2014 | Ryan et al. | 705/319 |

OTHER PUBLICATIONS

Banks et al, "Toward a Behavioral Approach to Privacy for Online Social Networks," Oct. 29, 2010, Springer Berlin Heidelberg, Online ISBN 978-3-642-16567-2, pp. 19-34.*
Jones et al, "Feasibility of Structural Network Clustering for Group-Based Privacy Control in Social Networks," Jul. 16, 2010, ACM 978-1-4503-0264.*

* cited by examiner

*Primary Examiner* — Alvin Tan
(74) *Attorney, Agent, or Firm* — Steven M. Greenberg, Esq.; CRGO Law

(57) ABSTRACT

Embodiments of the present invention provide a method, system and computer program product for the automated suggestion of a privacy level setting for a new connection in a social network. In an embodiment of the invention, a method for automated suggestions of privacy level settings for a new connection in a social network is provided. The method includes receiving a new connection for an end user of a social network and identifying mutual connections between the new connection and the end user. Thereafter, a suggested privacy setting for the new connection can be displayed in a display of a computer based upon privacy settings of the identified mutual connections. Optionally, a selection can be received of a different privacy setting than the suggested privacy setting and the different privacy setting can be established for the new connection.

14 Claims, 2 Drawing Sheets

AUTOMATED PRIVACY LEVEL SUGGESTIONS FOR SOCIAL NETWORKING

BACKGROUND OF THE INVENTION

1. Field of the Invention

The present invention relates to the filed of social networking and more particularly to the management of privacy settings for contacts in a social networking.

2. Description of the Related Art

A social network refers to a social structure of nodes each associated with a different person or organization. The interconnections of each node reflect direct relationships between the respective people and organizations such that the directness of a relationship between two persons or organizations associated with respective nodes can be summarized by the path of interconnections between the respective nodes. In this way, any one individual in a social network can evaluate the number and quality of social relationships with others in the network, those relationships ranging from close familial bonds to casual acquaintances.

The advent of the global Internet has changed the way in which social networks can be viewed. Originally, a mere visual tool describing a social phenomenon, computerized social networks facilitate the recognition and expansion of social networks amongst interacting users across the globe. Whereas geographic boundaries previously limited the extent and quality of a given social network, the global Internet enables limitless expansion of the social network based upon a vast set of aware collaborators coupled by the fabric of computer communications.

Commercial computerized social networks have become wildly popular in recent years—especially amongst the younger demographic. Examples include the MySpace™ computer socialized network maintained by MySpace, Inc. of Los Angeles, Calif., LinkedIn™ computerized business network maintained by LinkedIn Corporation of Palo Alto, Calif., and the Facebook™ computerized social network maintained by Facebook of Palo Alto, Calif. Commercial computerized social networks represent social networking services connecting users according to different types of interests in an aggregated view--generally a Web site hosting user contributed content through imagery and commentary.

Commercial computerized social networks allow users to create individual profiles. Each profile can include social media including imagery such as photographs of the user and things relevant to the user. Each profile further can include textual materials such as lifestyle information, or general writings. Notably, users can establish networks of connection or "friends". Friends can be specified manually by a given user and often represent the individuals or organizations known personally by the given user. Each of the friends can be presented in the Web site so as to allow linking to a corresponding profile for the friend. In this way, an end user literally can navigate shared connections of connections in the social network for a given user.

Currently, social networking applications allow users to create privacy settings that indicate the amount of information that different individuals are privy to access. Privacy settings can be compared to security settings in that security settings block access to information excepting for authorized users, while privacy settings limit the degree to which information can be shared with others and can range from no information to all information depending upon a class of a user seeking access to the information. Privacy settings, in this regard, can be established for access to photographs, postings, messages, or profile information so that only "friends" or possibly "friends of friends" can view the information, as an example. Thus, as it is well-understood in the art, security is a process that can support and enforce privacy, and therefore, privacy is an outcome of an application of security. It follows then, that a privacy setting is a desired consequence and security measures can be implemented to achieve a privacy setting.

At present, when a user adds a new social connection to the social network of the user, the user must manually select privacy settings for application for the new social connection, or the user must manually assign the new social connection to one of a general set of groups of different privacy levels. Alternatively, the user can manually edit the privacy settings at a later time. This forced effort usually results in new social connections being assigned default privacy levels, which may inadvertently expose the confidential information of the user, or may the new social connection being undesirably constrained defeating the ability of the user to effectively network with new contacts.

BRIEF SUMMARY OF THE INVENTION

Embodiments of the present invention address deficiencies of the art in respect to privacy settings for new connections in a social network and provide a novel and non-obvious method, system and computer program product for the automated suggestion of a privacy level setting for a new connection in a social network. In an embodiment of the invention, a method for automated suggestions of privacy level settings for a new connection in a social network is provided. The method includes receiving a new connection for an end user of a social network and identifying mutual connections between the new connection and the end user. Thereafter, a suggested privacy setting for the new connection can be displayed in a display of a computer based upon privacy settings of the identified mutual connections. Optionally, a selection can be received of a different privacy setting than the suggested privacy setting and the different privacy setting can be established for the new connection.

In one aspect of the embodiment, the suggested privacy setting for the new connection is based upon a privacy level group assigned to a largest set of the mutual connections. In another aspect of the embodiment, the suggested privacy setting for the new connection is based upon a privacy level group assigned to a most highly ranked one of the mutual connections. In yet another aspect of the embodiment, the suggested privacy setting for the new connection is a value computed as an average of values for privacy settings of the mutual connections.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automated suggestions of privacy level settings for a new connection in a social network. In accordance with an embodiment of the invention, mutual connections in a social network shared between a new connection of a social networking user and the social networking user can be identified. Thereafter, a privacy setting can be computed based upon corresponding privacy settings of the mutual connections. Finally, the computed privacy setting can be suggested to the social networking user for application according to security measures to the new connection in a graphical user interface of a client application for the social network.

Figure 1:
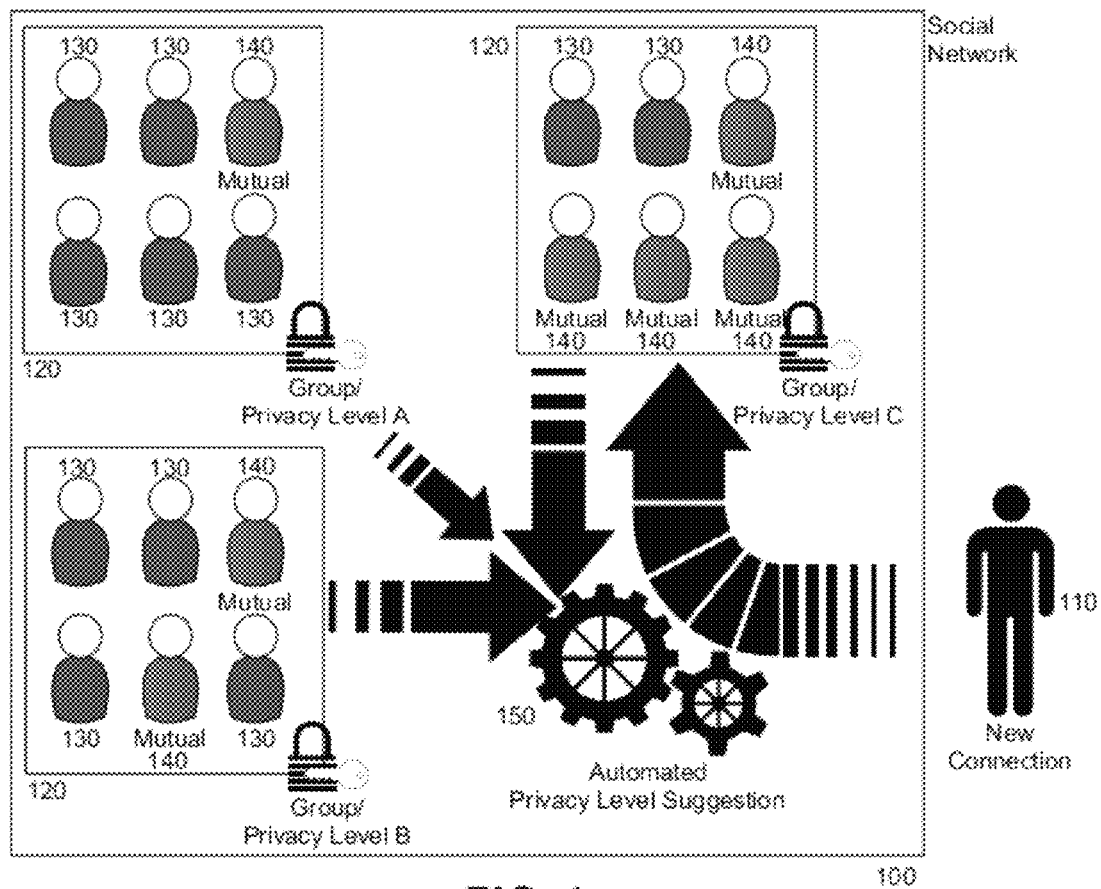
FIG. 1 is a pictorial illustration of a process for automated suggestions of privacy level settings for a new connection in a social network.

In further illustration, FIG. 1 pictorially shows a process for automated suggestions of privacy level settings for a new connection in a social network. As shown in FIG. 1, a new connection 110 can be added to a social network 100 of an end user of the social network 100. Different privacy groups 120 having correspondingly different combinations of privacy settings can be established for the end user of the social network 100. Each of the privacy groups 120 can have assigned thereto different social network connections 130, 140 of the end user of the social network 100. Automated privacy level suggestion logic 150 can compare the social networking connections of the new connection 110 to those of the end user of the social network 100 in order to identify mutual connections 140 shared by the end user of the social network 100 and the new connection 110.

Subsequently, one of the privacy groups 120 can be suggested for assignment to the new connection 110 based upon a computation of the mutual connections 140, for example one of the privacy groups 120 in which most of the mutual connections 140 have been assigned. In this regard, the suggestion can be presented graphically within a GUI for a client application accessing the social network 100 with imagery representative of each of the groups 120 and an indication of the social network connections 130, 140 in each of the groups 120 and also an indication of the mutual connections 140 in each of the groups 1. The GUI can be additionally enabled to permit the end user of the social network 100 to drag-and-drop an icon representative of the new connection 110 to a preferred one of the groups 120 in order to effectuate an assignment of the new connection 110 to the preferred one of the groups 120.

Figure 2:
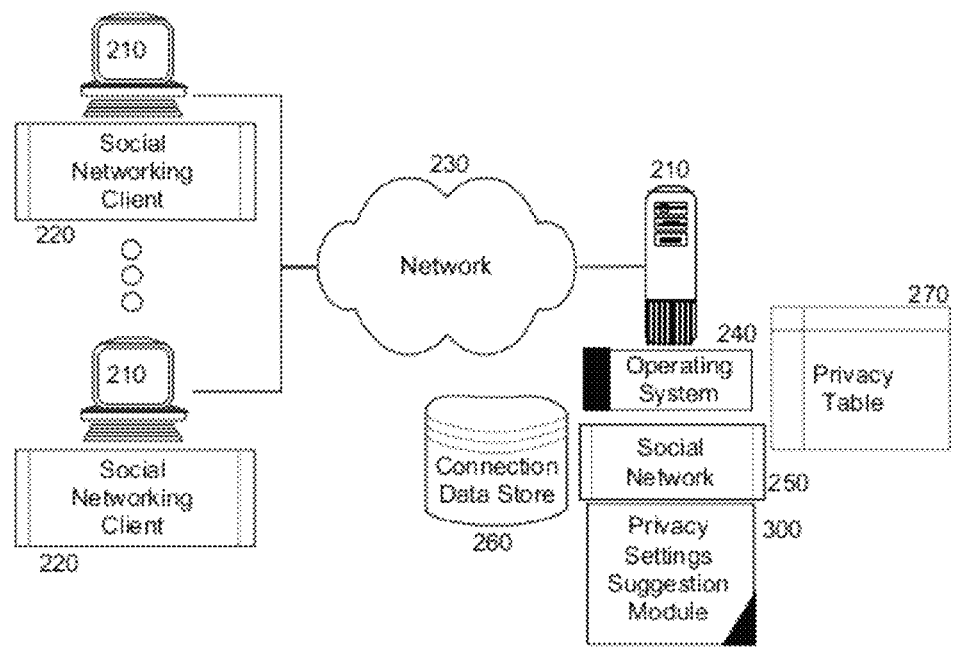
FIG. 2 is a schematic illustration of a social networking data processing system configured for automated suggestions of privacy level settings for a new connection; and, FIG. 3 is a flow chart illustrating a process for automated suggestions of privacy level settings for a new connection in a social network.

The process described in connection with FIG. 1 can be implemented within a social networking data processing system. In yet further illustration, FIG. 2 is a schematic illustration of a social networking data processing system configured for automated suggestions of privacy level settings for a new connection. The system can include a host server 210 with at least one processor and memory configured for communicative coupling to different computing devices 210 over computer communications network 230. The host server 210 can support the execution of an operating system 240 that in turn can host the operation of a social network 250 accessed by different social networking end users through different social networking clients 220 of respectively different computing devices 210.

A connection data store 260 can be coupled to the social network 250. The connection data store 260 can store records for different users of the social network 250 and the relationships between the different users such that each of the different users of the social network 250 can be associated with one or more different connections of the other users of the social network 250. To manage degrees of access to information posted by the different users of the social network 250, a privacy level table 270 can be provided storing privacy settings for information provided by the different users of the social network 250. In particular, the privacy level table 270 (which can be one or several tables in practice, stored centrally with the social network 250, or stored distributively with the social networking clients 220) can associate privacy settings for each user of the social network 250 with respect to content provided by each user of the social network 250 so as to limit which if any connections of a user of the social network 250 can view content provided by the user of the social network 250, or provide additional content in association with the user of the social network 250.

Of note, privacy level suggestion module 300 can be coupled to the social network 250, the privacy level table 270 and the connection data store 260. The module 300 can include program code enabled upon execution in the memory of the host server 210 to identify mutual connections between a new connection added to a list of connections for an end user of the social network 250 and the end user of the social network 250. Based upon the mutual connections, one or more privacy settings can be suggested to the end user through a GUI for the social network 250 for establishment within the privacy level table 270 for the end user with respect to the new connection. For example, a privacy setting established for a majority of mutual connections can be suggested for establishment for the new connection. Alternatively, where the privacy setting is a numerical value set from a range of values, an average value of the privacy setting for the mutual connections can be computed and suggested for establishment for the new connection. As yet another alternative, to the extent that some connections are rated or ranked more highly than others, the privacy setting of the most highly ranked mutual connection can be suggested for establishment for the new connection.

Figure 3:
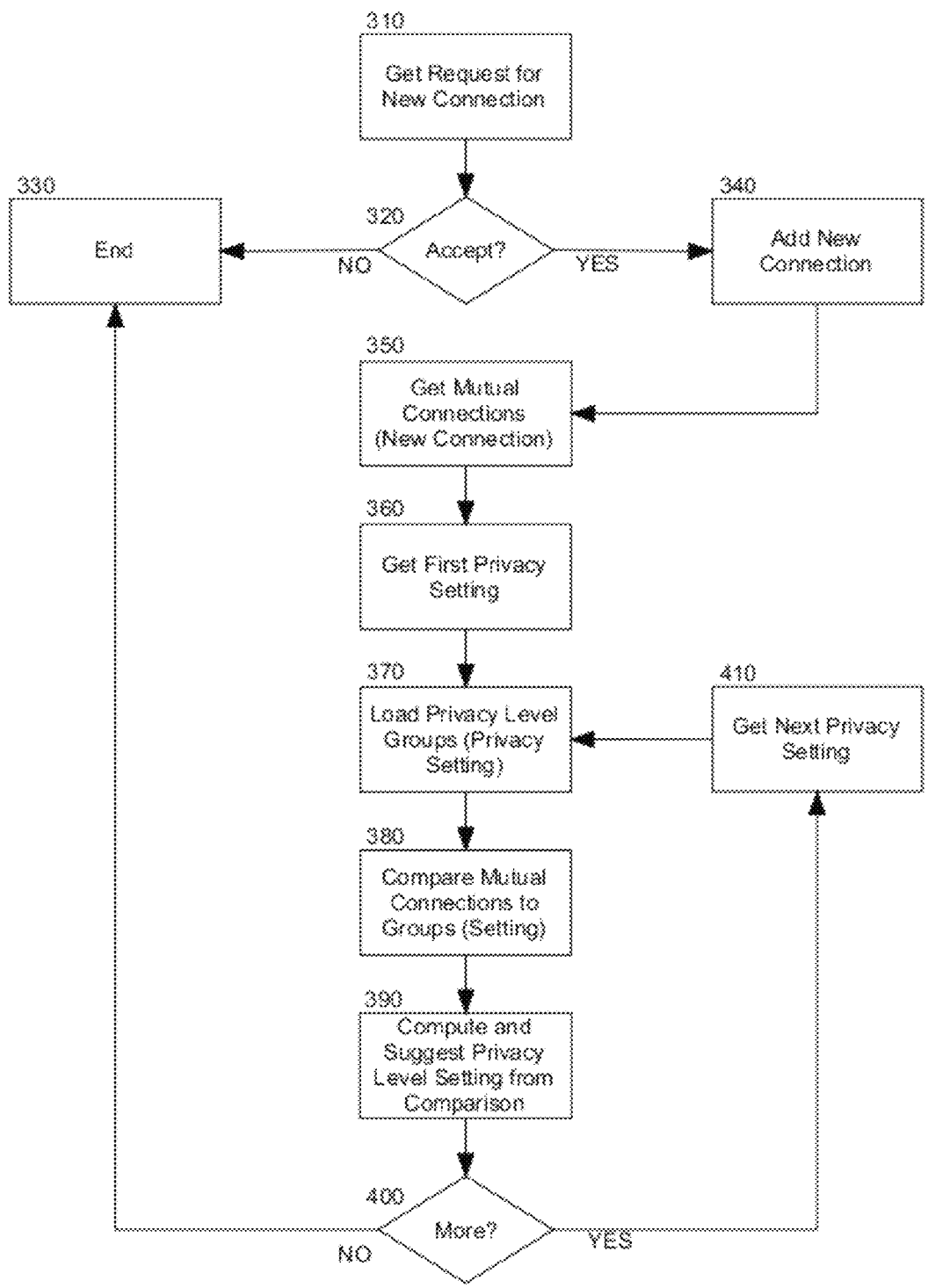

In even yet further illustration of the operation of the privacy level suggestion module 300, FIG. 3 is a flow chart illustrating a process for automated suggestions of privacy level settings for a new connection in a social network. Beginning in block 310, a request for a new connection can be received for an end user of a social network. In decision block 320, it can be determined whether or not the request has been accepted. If so, in block 340 the new connection can be added to a listing of connections for the end user and in block 350, one or more mutual connections can be identified for the new connection and the end user.

In block 360, a first privacy setting can be selected for processing for the new connection. In block 370, different privacy level groups can be loaded, each group corresponding to a different privacy level and including at least one connection of the end user. In block 380, the mutual connections of the new connection can be compared to the connections listed in the different groups. Thereafter, in block 390 a privacy level group for the new connection can be suggested to the end user, the suggested privacy level group having the most mutual connections than the other privacy level groups. In response to the suggestion, the end user can place the new connection in the suggested privacy level group, or in another privacy level group. In decision block 400, if additional privacy settings remain to be processed, in block 410 a next privacy setting can be selected for processing and the process can be repeat through block 400. When no further privacy settings remain to be processed, the process can end in block 330.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for automated suggestions of privacy level settings for a new connection in a social network, the method comprising:
   receiving a new social media connection for an end user of a social network;
   identifying mutual social media connections between the new social media connection and the end user of the social network;
   displaying in a display of a computer a suggested social media privacy setting for a selected social media privacy setting of the new social media connection based upon a comparison of privacy settings already established for individual ones of the identified mutual social media connections to privacy settings for connections of the end user listed in different privacy level groups;
   establishing the suggested social media privacy setting for the selected social media privacy setting of the new social media connection in the social network;
   determining if additional social media privacy settings remain to be processed for the new social media connection; and,
   repeating the displaying and establishing for each remaining social media privacy setting for the new social media connection.

2. The method of claim 1, further comprising:
   receiving a selection of a different privacy setting than the suggested privacy setting; and,
   establishing the different privacy setting for the new connection.

3. The method of claim 1, wherein the suggested privacy setting for the new connection is based upon a privacy level group assigned to a largest set of the mutual connections.

4. The method of claim 1, wherein the suggested privacy setting for the new connection is based upon a privacy level group assigned to a most highly ranked one of the mutual connections.

5. The method of claim 1, wherein the suggested privacy setting for the new connection is a value computed as an average of values for privacy settings of the mutual connections.

6. A social networking data processing system configured for automated suggestions of privacy level settings for a new connection, the system comprising:
   a host server comprising at least one processor and memory and configured for communicative coupling to a plurality of computing devices over a computer communications network;
   a social network hosted by the host server; and,
   a privacy level suggestion module coupled to the social network, the module comprising program code enabled upon execution in memory of a computer to identify mutual social media connections between a new social media connection of an end user of the social network and the end user, to display in a graphical user interface (GUI) for the social network a suggested privacy setting for a selected social media privacy setting of the new social media connection based upon a comparison of privacy settings already established for individual ones of the identified mutual social media connections to privacy settings for connections of the end user listed in different privacy level groups, to establish the suggested social media privacy setting for the selected social media privacy setting of the new social media connection in the social network, to determine if additional social media privacy settings remain to be processed for the new social media connection and to repeat the displaying and establishing for each remaining social media privacy setting for the new social media connection.

7. The system of claim 6, wherein the suggested privacy setting for the new connection is based upon a privacy level group assigned to a largest set of the mutual connections.

8. The system of claim 6, wherein the suggested privacy setting for the new connection is based upon a privacy level group assigned to a most highly ranked one of the mutual connections.

9. The system of claim 6, wherein the suggested privacy setting for the new connection is a value computed as an average of values for privacy settings of the mutual connections.

10. A computer program product for automated suggestions of privacy level settings for a new connection in a social network, the computer program product comprising:
    a non-transitory computer readable storage medium having computer readable program code embodied therewith, the computer readable program code comprising:
    computer readable program code for receiving a new social media connection for an end user of a social network;
    computer readable program code for identifying mutual social media connections between the new social media connection and the end user of the social network;
    computer readable program code for displaying in a display of a computer a suggested privacy setting for a selected social media privacy setting of the new social media connection based upon a comparison of privacy settings already established for individual ones of the identified mutual social media connections to privacy settings for connections of the end user listed in different privacy level groups;
    computer readable program code for establishing the suggested social media privacy setting for the selected social media privacy settings of the new social media connection in the social network;
    computer readable program code for determining if additional social media privacy settings remain to be processed for the new social media connection; and,
    computer readable program code for repeating the displaying and establishing for each remaining social media privacy setting for the new social media connection.

11. The computer program product of claim 10, further comprising:
    computer readable program code for receiving a selection of a different privacy setting than the suggested privacy setting; and, computer readable program code for establishing the different privacy setting for the new connection.

12. The computer program product of claim 10, wherein the suggested privacy setting for the new connection is based upon a privacy level group assigned to a largest set of the mutual connections.

13. The computer program product of claim 10, wherein the suggested privacy setting for the new connection is based upon a privacy level group assigned to a most highly ranked one of the mutual connections.

14. The computer program product of claim 10, wherein the suggested privacy setting for the new connection is a value computed as an average of values for privacy settings of the mutual connections.

* * * * *